United States Patent [19]
Oussani, Jr. et al.

[11] Patent Number: 5,891,300
[45] Date of Patent: Apr. 6, 1999

[54] TABBING DEVICE

[75] Inventors: James J. Oussani, Jr.; Gregory P. Oussani, both of Brooklyn, N.Y.

[73] Assignee: The Staplex Company, Inc., Brooklyn, N.Y.

[21] Appl. No.: 13,405

[22] Filed: Jan. 26, 1998

[51] Int. Cl.$^6$ .................................................. B32B 31/00
[52] U.S. Cl. .................... 156/541; 156/483; 156/361; 156/542
[58] Field of Search .................... 156/483, 484, 156/485, 541, 542, 361

[56] References Cited

U.S. PATENT DOCUMENTS

| | | | |
|---|---|---|---|
| 4,294,644 | 10/1981 | Anderson | 156/361 |
| 4,639,287 | 1/1987 | Sakura | 156/361 |
| 5,185,983 | 2/1993 | Slater | 156/483 X |
| 5,314,567 | 5/1994 | Noll | 156/484 X |
| 5,376,217 | 12/1994 | Janssen, Jr. et al. | 156/542 X |
| 5,525,184 | 6/1996 | Luff et al. | 156/361 |
| 5,587,043 | 12/1996 | Hying et al. | 156/542 X |
| 5,711,846 | 1/1998 | Alicea | 156/483 X |

*Primary Examiner*—James Engel
*Attorney, Agent, or Firm*—Paul J. Sutton

[57] ABSTRACT

A tabbing machine for applying adhesive tabs over the edge of an article comprises a feed mechanism for advancing tabs from a roll of tape past a tab discharge station. A tab applicator station located downstream of the tab discharge station functions to press the adhesive surfaces of a tab carried by the lead edge of an article to be tabbed which is moved past the applicator station. The device includes a control mechanism having a first photo sensor which senses the presence or absence of an article to be tabbed and a second photo sensor downstream of the first photo sensor for sensing a tab positioned at a tab discharge station. The sensors are interconnected in such manner that the tape drive mechanism for feeding tabs can be energized only when the infeed table is clear of an article to be tabbed and when no tab is located at the discharge station. The position of a tab relative to an article to be tabbed is controllable responsive to adjustment of the second or tab locator sensor.

7 Claims, 5 Drawing Sheets

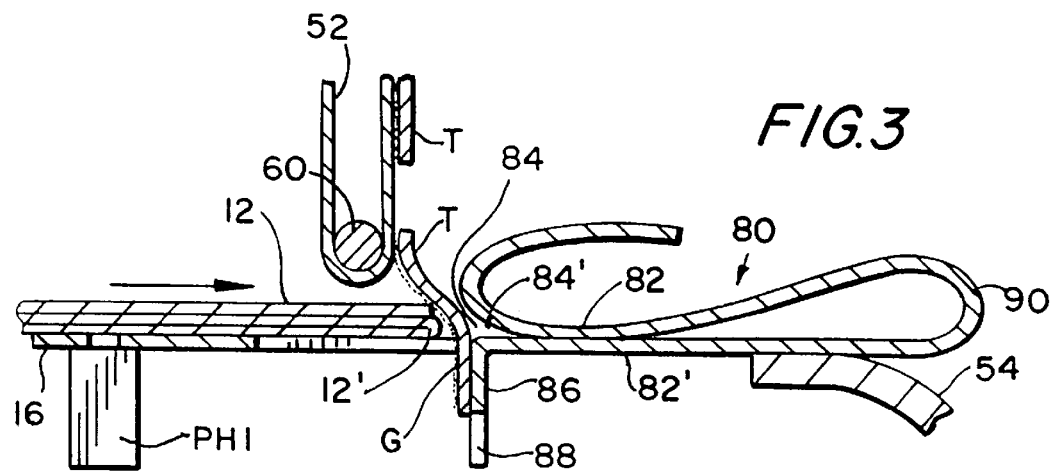
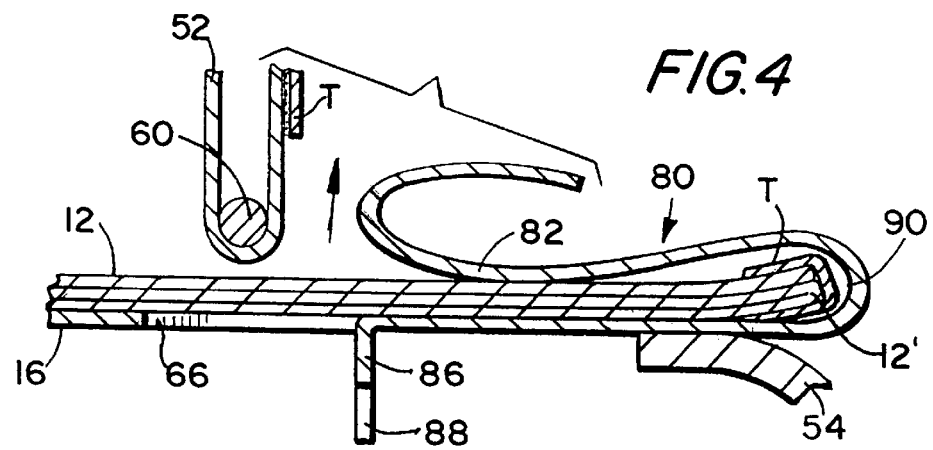
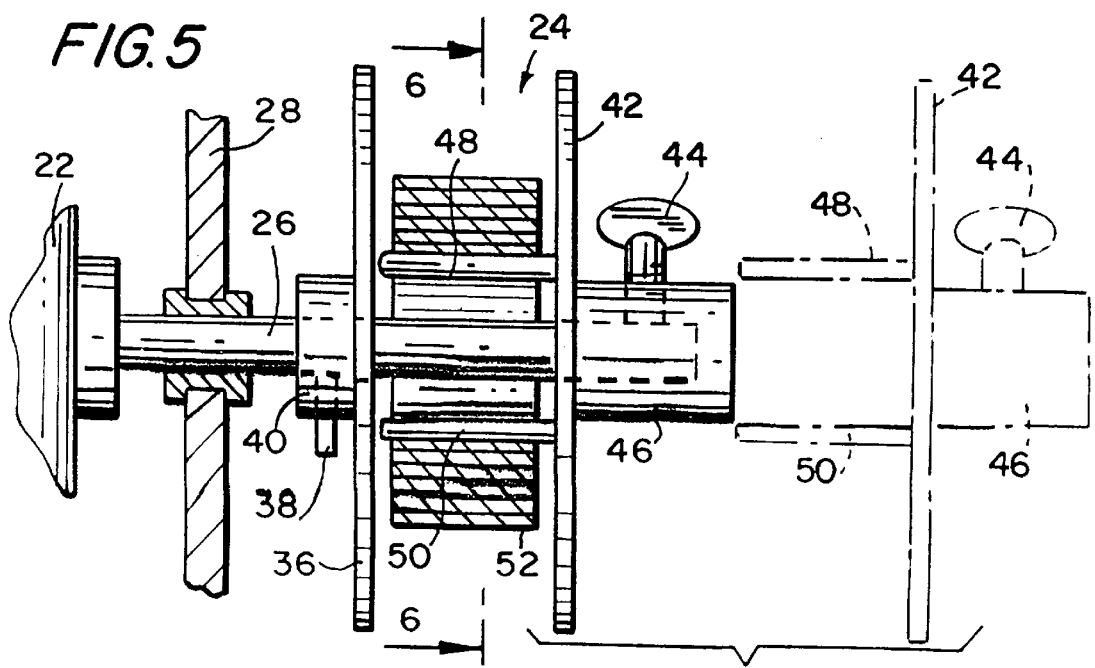

TABBING DEVICE

BACKGROUND OF THE INVENTION

The present invention is directed to a tabbing device, namely, an apparatus for placing adhesive backed tabs over the lead edge of envelopes or similar flat articles such as thin packets. The invention is more particularly directed to a tabber device intended for use in small offices, in house mail departments, etc., as opposed to high volume automatic feed industrial tabbers. Still more particularly, the invention is directed to a tabber device having fail safe features and also being capable of adjustably positioning the tab which is applied such that the degree of overlap of the tab with respect to the lead surface of an article can be reliably controlled. The invention is further directed to a tabbing device which is automatically adjusted to apply tabs of different sizes.

PRIOR ART

Tabbing devices, or tabbers, as they are more commonly known in the trade, function to apply a tab over the lead edge of an article thereby to provide a temporary closure.

Tabs are conventionally supplied mounted on a tape having a release coated surface. The tabs are regularly spaced along the length of the tape, the tape adjacent surface of the tab being coated with a pressure sensitive adhesive which is lightly adherent to the release coat but strongly adherent to an uncoated surface, such as an envelope, polyethylene package or the like.

The typical tabbing machines are intended for high volume use and include mechanisms for feeding packages to be tabbed, vacuum or like mechanisms for serially removing tabs from a tape or other supply and other means for shifting the tab to a desired closure position on the articles to be processed.

Representative examples of such industrial type machines located in the course of a search are disclosed in U.S. Pat. Nos. 3596042; 4069077; 4154640; 5464497; 5554239; 5593749. The referenced patents are, in all cases, complex industrial machines for affecting tabbing and like applications in what might be described as essentially factory environments.

SUMMARY OF THE INVENTION

The present invention is directed to a tabbing device intended to be used in small volume applications, such as small offices, in house mail departments, and like environments where relatively small volumes of packages are to be tabbed or in instances where mailings of relatively low volume are desirous of securing the benefits of the lower postage rates accorded second class mail.

The invention is further directed to a tabbing device which may be operated by unskilled labor, it being merely necessary to pass an envelope or a packet to be tabbed through a tabbing station at which a tab is removed from a reel of tabs and accurately and adjustably applied over the lead edge of an envelope or packet to be tabbed.

A still further object of the invention is the provision of a tabbing device of the type described, characterized in that sensing means are employed precisely to locate a tab to be applied, the device being automatically deactivated when a tab is properly located for application. The device cannot be reactivated until the located tab is removed, i.e. by application over an article. By this arrangement, the possibility of false discharges of a tab, i.e., resulting from introduction of an article to be sealed and withdrawal of the article before passing the tabbing station, is positively eliminated.

A further object of the invention is the provision of a tabbing device which may be readily adjusted to accommodate tabs of different sizes and to enable the tabs to be applied over the lead edge of an article in a variety of overlapping conditions.

A still further object of the invention is the provision of a tabbing device especially suited for small business applications and which is fool-proof in operation.

DETAILED DESCRIPTION OF THE DRAWINGS

Referring now to the drawings,

FIG. 3 is a fragmentary cross-sectional view similar to FIG. 2 in a first advanced condition of an envelope to be tabbed.

FIG. 4 is a fragmentary cross-sectional view similar to FIG. 3 in a further advanced condition of the envelope to be tabbed.

FIG. 5 is a partial cross-sectional view taken along lines 5—5 of FIG. 1.

DETAILED DESCRIPTION OF VIEWS

Figure 1:
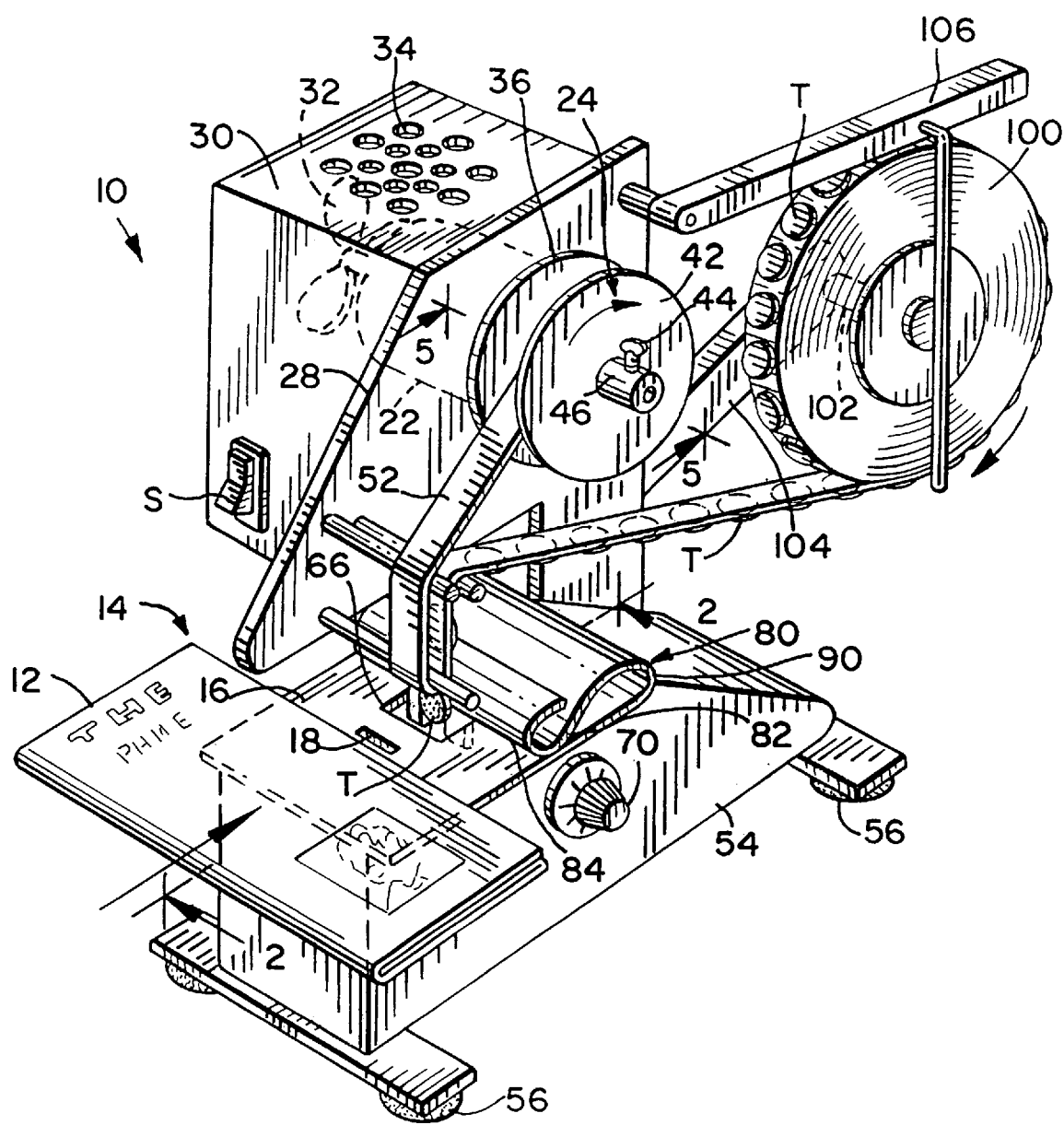
FIG. 1 is a perspective view of a tabber device in accordance with the invention.

As best seen in FIG. 1 a tabbing machine 10 is disclosed and positioned to process a folded article 12, located at feed-in area 14. The article may comprise an envelope, a folded series of sheets, a polyethylene bag, etc. As is well known, tabs are normally applied in situations where a tight seal is not desired to effect closure and also provide an indication as to whether or not the article has been opened.

While the tabbing device of the present invention is illustrated in connection with a manual feed, it will be readily recognized that the machine is adaptable for use with known automatic feed assemblies.

As the article 12 is advanced over the tab application deck or table 16, it activates optical control device or scanner PH1, i.e. reflecting photo cell, known per se, located beneath deck 16 and adapted to scan through a slot 18 in the deck. As will be more fully described hereinafter, it is the function of the scanner PH1 to interact with a second scanner PH2 in a manner whereby the drive mechanism for advancing tabs is deactivated when an envelope or pouch 12 is disposed over the slot 18 and in cooperation with the second scanner PH2 to initiate feed of a second tab when the envelope is retracted beyond the slot 18 and when simultaneously the second photocell PH2 senses an absence of a tab at the tab discharge station D.

Referring to FIG. 1, tab drive is affected by spool take-up reel 24. Spool 24 is journaled on shaft 26 which, by reduction gears, is linked to the drive shaft of motor 22.

Shaft 26 extends through support wall 28. The motor 22 is contained in housing 30 which may be cooled via fan 32 and vent holes 34.

An inner spool disk 36 (FIG. 5) of take-up assembly 24, is mounted on shaft 26 and fixed to the shaft as by set screw 38 secured in a hub 40 of the spool disk 36. A second removable spool disk 42 is mounted on shaft 26 and is maintained in mounted position via thumb screw 44 threaded into hub 46 fixed to disk 42.

Figure 6:
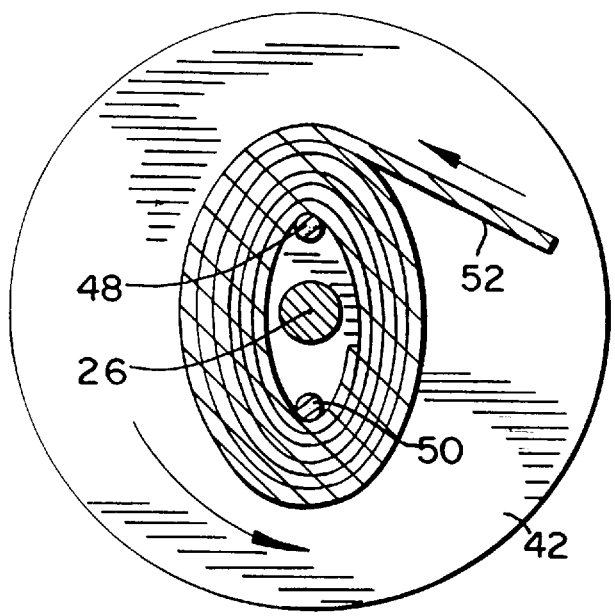
FIG. 6 is a sectional view taken along the lines 6—6 of FIG. 5.

A pair of elongated pins 48, 50 are mounted on disk 42 and extend part way toward disk 36, the pins 48, 50 being arranged to carry the tape which is fed from tab supply carrier roll 100. As best seen from FIG. 6, the wound tape on pins 48, 50 is maintained clear of the tape drive shaft 36 facilitating removal of tape 52 and quick replacement of a new spool after the tabs T have been separated from the tape.

Figure 2:
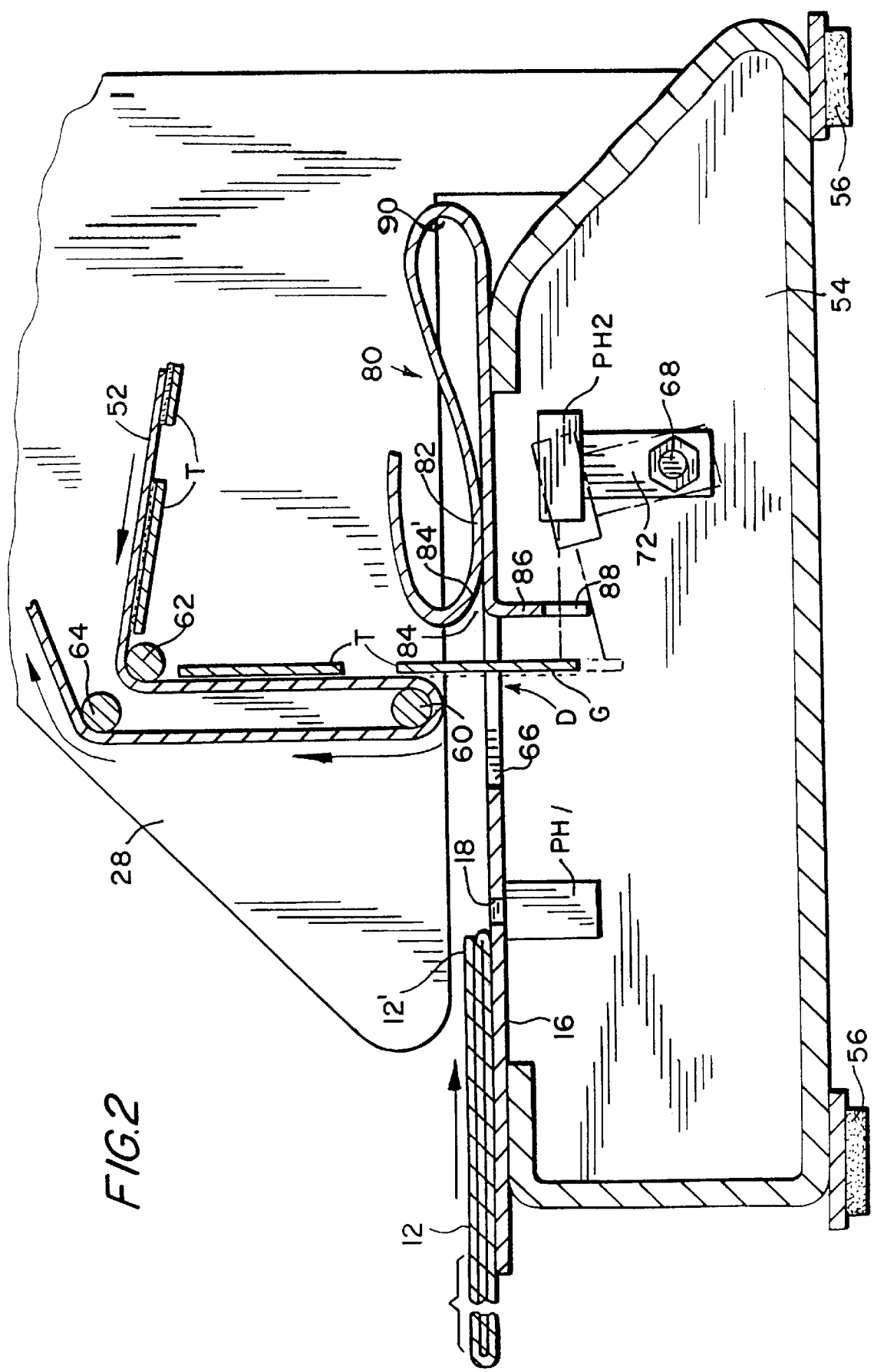
FIG. 2 is an enlarged fragmentary cross-sectional view taken along the lines 2—2 of FIG. 1.

A supply roll of tabs 100 is rotatably mounted on shaft 102 journaled on arm 104 fixed to the housing wall 28. An arm 106 pivotally mounted on support plate 28 is gravitationally urged against upper portion of supply roll 100 to ensure that the pay out of tape 52 carrying tabs T is smoothly effected. As best seen in FIG. 2, the tape 52 emerging from supply roll 100 is advanced to a tab discharge station which functions to separate the tabs from the tape.

The tape carrying tabs T is a commercially available product, a satisfactory product being manufactured by Avery Products of Diamond Bar, Calif. The tape is comprised of a release coated membrane to which tabs T are lightly bonded. The tabs T are lightly secured to the tape by a pressure sensitive coating or gum G which gum is lightly adherent to the release coating of the tape but strongly adherent to envelopes, mailings or polyurethane bags.

The tabs T are separated from tape 52 as a result of the tape being guided about a surface which bends the tape at a sharp angle. Referring to FIG. 2 tape 52 emerging from reel 100 is passed over guide pin 62 projecting from plate 28 under discharge pin 60 thence upwardly over guide pin 64 leading to the take-up assembly 24. As noted, due to the limited adherence of the tabs T to the tape 52 and the sharp bend of the tape about rod 60, the main body of the tab is released from tape 52. However, as will be pointed out hereinafter, the tab will become stationary and still supported by the tape at the discharge station D as a result of the tape feed apparatus being deactivated responsive to optical sensor PH2. As is apparent from FIG. 2 the partially separated tabs T will project through a discharge station defined by an aperture 66 in the deck or table 16.

The precise positioning of the partially released tabs T at discharge station D is controlled by photocell-optical sensor PH2. The sensor PH2 is mounted on arm 72 which is in turn pivoted on shaft 68. The pivotal relationship of arm 72 relative to shaft 6 8 may be controlled by adjustment knob 70 on the outer side of housing 54.

It is the primary function of sensor PH2 to detect the lead edge of tab T which has passed through aperture 66 and to de-energize the take-up reel assembly 24 when the lower most or lead edge of the partially released tab has reached a predetermined position beneath the surface of deck 16. When the lead edge of the tab is sensed, the tape take-up reel assembly 24 is deactivated and the location of the partially detached tab established.

Figure 9:
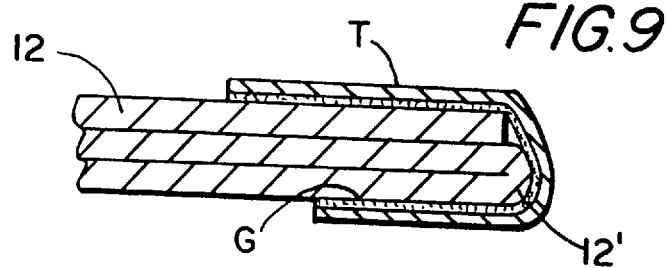
FIGS. 9 and 10 are partial cross-sectional views illustrating two positions at which the tab may be applied relative to the lead edge of an envelope or packet to be sealed.
Figure 10:
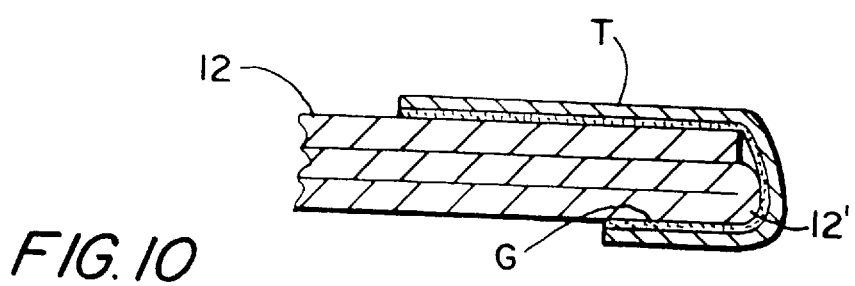

By adjustment of the sensor PH2, it is possible to vary the applied position of the tab T relative to the leading edge 12' of the envelope or package to be tabbed. More particularly, considering FIGS. 9 and 10, it will be appreciated that a greater amount of the tab is bonded to the upper surface of the envelope 12 in FIG. 10 then is the case in respect of FIG. 9. This difference is achieved by adjusting the sensor PH2 such that a greater length of tab projects below table 16 in the case of FIG. 9 then was the case in respect of FIG. 10. This feature is extremely useful since it enables the tab to be applied in a manner which reveals or obscures increments of the substrate to which the tab is bonded as desired by the operator. Additionally and importantly, the sensor PH2, being responsive to passage of the lead edge of a tab, enables the device to be employed with tabs of a wide variety of sizes.

Tabs are applied to the mailer or like article 12 by advancing the same through a nipper sealer mechanism or tab applicator station 80, located downstream from tab discharge station D. Details of the applicator station are best appreciated from a consideration of FIGS. 3 and 4. The applicator device is comprised of a yieldable metallic sealing member preferably formed of a resilient phosphor bronze material. The mechanism 80 includes a depending leg 86 mounted in cut out 88. The operative light beam of reflecting photosensor PH2 passes beneath the leg 86 through slot 88 and impinges on the lead edge or edge adjacent portions of tab T as the edge enters slot 88.

The applicator assembly 80 includes an arcuate bend 90, the phosphor bronze incorporating lower and upper legs 82' and 82 respectively. The upstream end of leg 82 is bent upwardly to define a mouth portion 84 having an upper cam surface 84' inclined downwardly.

As is apparent from FIGS. 3 and 4, the lead edge of the item to be sealed will first engage the gummed surface G of the tab and as the envelope or like enclosure is shifted from left to right, i.e. from the position of FIG. 3 to that of FIG. 4, the tab T is folded about the lead edge 12' of the article 12 whereby the tab is resiliently pressed against the upper and lower surfaces and the lead edge of article 12. As previously noted, by adjusting the sensor PH2, the tab may be applied in a manner in which more or less of the tab may optionally lie against the respective upper and lower surfaces of the article 12.

Figure 7:
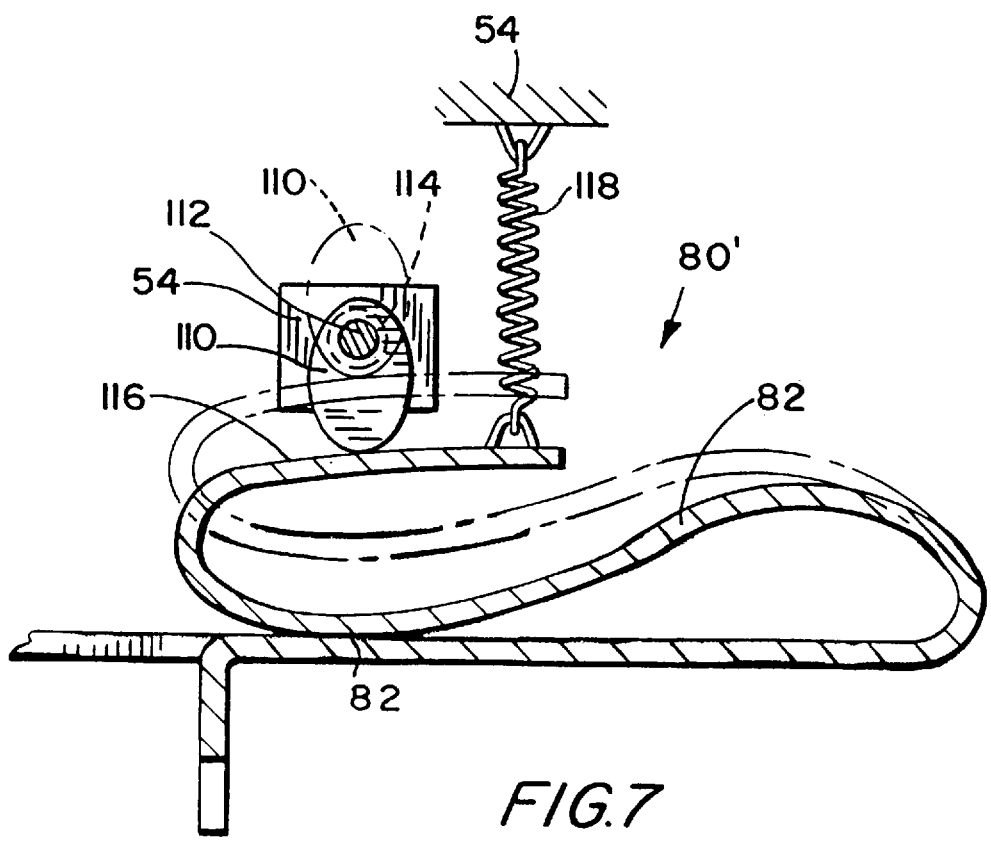
FIG. 7 is a partial cross-sectional view of an adjusting means enabling the tabbing device to be adapted to articles of various thickness.

FIG. 7 illustrates an embodiment of the invention which enables the device to be employed with packets of greater thickness than those illustrated in the remaining figures. In accordance with this embodiment, a modular or replacement sealer mechanism 80', is rendered adjustable by providing cam 110 pivoted on shaft 112, made fast to the housing. Adjustment knob 114 rotates the shaft from a downmost solid line position for handling thin articles 12 to an open dot and dash line position for the handling of thicker articles, such as magazines. Tension spring 118 linked between the housing and uppermost edge of band 80 causes the legs 82, 82' to be spread such that the opening between the legs is governed by the adjusted position of cam 110.

An important feature of the invention resides in the fool-proof nature of operation of the device. More particularly, it is necessary to coordinate the controls of the device in a manner in which excess tabs are not fed unless and until a completed tabbing operation is effected. In other words, it is necessary for the desired fool proof operation, that the motor 22 be energized only after a tab has been properly applied and the article with the appended tab removed.

Figure 8:
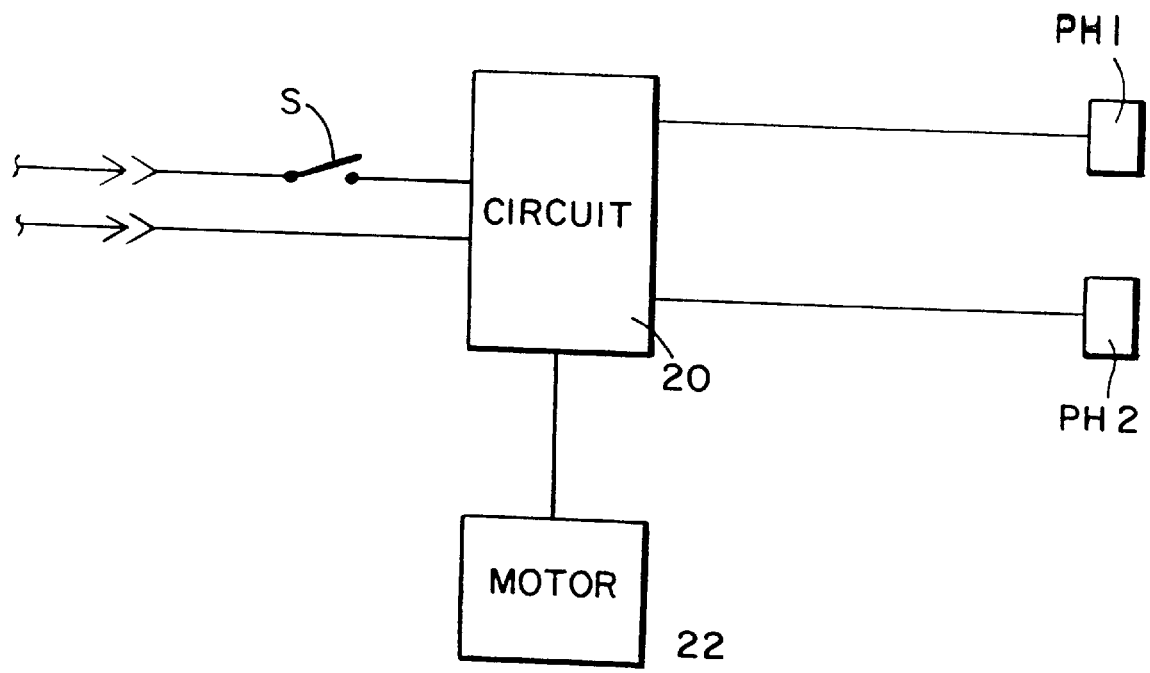
FIG. 8 is a schematic electrical circuit diagram of the control device for the tabber.

Referring now to FIG. 8, the sensors PH1 and PH2 are preferably reflective photocell scanners, i.e., devices which are responsive to an article in the path of the photocell beam. Sensor PH1 incorporates a switching mechanism which is in the normally closed position, except when an article 12 is disposed in blocking position of aperture 18. In the blocked position of such aperture, the switching mechanism controlled by scanner PH1 is held open and remains so as long as aperture 18 is blocked.

Photosensor PH2, which is likewise of the reflected beam type known per se, is normally closed and opens when and only when a tab T intersects the beam emitted by photocell PH2. The switches controlled by sensors PH1 and PH2 are wired in series such that motor 22 can be energized only when the switches controlled by PH1 and PH2 are in the closed or conducting position. This condition can occur only when aperture 18 is not blocked and also when no tab is positioned to be scanned by the beam of photosensor PH2.

The operation of the device will be apparent from the preceding description. On/off switche is first energized and since no article (at the onset of operation) blocks aperture 18 and assuming no tab intersects the beam of scanner PH2, series connection of the switches controlled by sensors PH1 and PH2 will be completed and the motor 22 energized. As the tape is advanced, a first tab will become separated from the tape and intersect the beam sensor PH2, opening the switch controlled by this sensor, and shutting off current to the motor 22. An operator will now advance an article 12 across the infeed table blocking aperture 18 and opening the switch controlled by sensor PH1. Since both of sensors PH1 and PH2 are in the "open" condition, the motor 22 cannot be energized. This is true despite the possibility that an inexperienced operator may advance an article 12 sufficiently far to dislodge the tab in the discharge station D thus causing the switch controlled by PH2 to close.

Assuming that the article 12 is properly advanced past the tab discharge station and through the tab applicator spring assembly 80, the removal of the applied tab will cause the switch controlled by PH2 to close. However, since the switch controlled by sensor PH1 will remain in the open position, so long as the aperture 28 is blocked by article 12, the motor 22 cannot be energized.

When article 12 is removed from blocking position of aperture 18, the switch controlled by sensor PH1 will close, and since there is no tab in the path of sensor PH2, the switches controlled by PH1 and PH2 will be closed enabling motor 22 to be energized. As soon as a tab is intercepted by the beam of sensor PH2, the switch controlled by PH2 will open and current to the motor will be interrupted.

As will be apparent from the preceding description, the sensor PH2 serves the multiple functions of automatic positioning of a tab to be applied at the discharge station, as a control means for the motor 22, and also, as a result of adjusting the angle of arm 72, as a means for adjusting the position of a tab relative to an article to be tabbed. Automatic adjustment for tabs of different sizes is an inherent result of utilizing the photo beam responsive to the lead edge of an advanced tab.

From the preceding description, it will be appreciated that there is provided in accordance with the invention, a simple yet versatile tabbing device especially suitable for low volume applications such as in-house mail departments of small businesses, churches, etc. The device is simple to operate requiring the user merely to advance an article to be tabbed across a table and withdrawing the article when tabbing has been completed. The device is user-friendly in the sense that the tabbing operations are totally passive, i.e., there is no motorized action involved in affixing the tab, the motor being energized solely after a tabbing operation has been completed and the users hands withdrawn from the vicinity of the device. The tabber is extremely versatile in enabling the use of tabs of a wide variety of sizes with little or no adjustments. Further, the device may be adjusted to apply tabs at any of a variety of positions relative to the edge of the article to be tabbed.

As will be apparent to those skilled in the art and familiarized with the instant disclosure, numerous variations in details of construction may be made without departing from the spirit of the invention. Accordingly, the invention is to be broadly construed within the scope of the appended claims.

We claim:

1. A tabber device for applying an adhesive backed tab over the lead edge of an article advanced along a generally planar infeed table, said device including a supply tape having regularly spaced tabs thereon, comprising an aperture formed in said table, tab feed means for advancing said tape along a selected path proximate said aperture, discharge station means adjacent an upper surface of said table adjacent said aperture for partially removing tabs from said tape and shifting portions of a tab so removed through said aperture, sensing means operatively connected to and controlling said tape feed means, said sensing means including an optical scanner positioned below said table in proximate relation to said aperture for sensing the edge of a tab extending through said aperture of said table and deactivating said tape feed means responsive to sensing of said tab reaching a pre-selected position beneath said table, adjustment means for shifting said sensing means toward and away from said aperture to thereby vary the position of said lead edge of said tab extending through said aperture, tab applicator means downstream of said discharge station means for folding and applying a tab over the lead edge of an article traversing said discharge means and second sensing means upstream from said aperture for maintaining said tab feed means in a deactivated condition so long as an article is disposed on said table.

2. A device in accordance with claim 1 wherein said second sensing means includes an optical scanner device.

3. A tabber device for applying an adhesive backed tab over the lead edge of an article advanced along a generally planar infeed table, said device including a supply tape having regularly spaced tabs thereon, comprising an aperture formed in said table, tab feed means for advancing said tape along a selected path proximate said aperture, discharge station means adjacent an upper surface of said table adjacent said aperture for partially removing tabs from said tape and shifting portions of a tab so removed through said aperture, sensing means operatively connected to and controlling said tape feed means, said sensing means including an optical scanner positioned below said table in proximate relation to said aperture for sensing the edge of a tab extending through said aperture of said table and deactivating said tape feed means responsive to sensing of said tab reaching a pre-selected position beneath said table, and tab applicator means downstream of said discharge station means for folding and applying a tab over the lead edge of an article traversing said discharge means, said tab applicator means comprising a resilient metallic band including a first arm disposed substantially in the plane of said table, and a second arm inclined toward said first arm, said second arm being adapted to be biased away from said first arm responsive to movement of an article between said arms.

4. A device in accordance with claim 3 wherein said second arm includes a deflector cam surface means positioned to engage the lead edge of an article passing downstream of said discharge station for yieldably shifting said second arm away from said first arm.

5. A tabbing device for applying pressure sensitive tabs removably mounted on a release coated tape to an article to be tabbed comprising an infeed table having an aperture formed therethrough, tape feed means for advancing said tape along a predetermined path, tab discharge means along said path disposed above said table in proximate relation to said aperture for separating a portion of tabs traversing said discharge means and advancing said separated portion through said aperture, optical scanner sensing means below said table adjacent said aperture for detecting the presence of a separated portion of a tab extending through said aperture and deactivating said tape feed means responsive to detection of a said separated portion, adjustment means operatively associated with said scanner for shifting said scanner toward and away from said aperture to thereby control the extent of separated portion of said tab extending through said aperture, and tab applicator means downstream of said aperture for folding a tab separated from said tape over an article to be tabbed, said applicator means comprising a resilient metallic band including a first arm disposed substantially in the plane of said table and a second arm inclined toward said first arm, said second arm being resiliently biased toward said first arm, said second arm including an upstream cam portion positioned to engage and be deflected away from said first arm responsive to engagement with an downstream moving article to be tabbed.

6. A tabbing device for applying pressure sensitive tabs removably mounted on a release coated tape to an article to be tabbed comprising an infeed table having an aperture formed therethrough, tape feed means for advancing said tape along a predetermined path, tab discharge means along said path disposed above said table in proximate relation to said aperture for separating a portion of tabs traversing said discharge means and advancing said separated portion through said aperture, optical scanner sensing means below said table adjacent said aperture for detecting the presence of a separated portion of a tab extending through said aperture and deactivating said tape feed means responsive to detection of a said separated portion, adjustment means operatively associated with said scanner for shifting said scanner toward and away from said aperture to thereby control the extent of separated portion of said tab extending through said aperture.

7. A tabbing device for applying pressure sensitive tabs removably mounted on a release coated tape to an article to be tabbed comprising an infeed table having an aperture formed therethrough, tape feed means for advancing said tape along a predetermined path, tab discharge means along said path disposed above said table in proximate relation to said aperture for separating a portion of tabs traversing said discharge means and advancing said separated portion through said aperture, sensing means below said table adjacent said aperture for detecting the presence of a separated portion of a tab extending through said aperture and deactivating said tape feed means responsive to detection of a said separated portion, and second sensing means upstream of said aperture for detecting the presence of an article disposed on said table and maintaining said tape feed means in a deactivated condition responsive to the continued presence of a said article on said table.

\* \* \* \* \*